United States Patent [19]

Phillips

[11] 4,272,045
[45] Jun. 9, 1981

[54] NUTATION DAMPING IN A DUAL-SPIN SPACECRAFT

[75] Inventor: Kevin J. Phillips, Hightstown, N.J.

[73] Assignee: RCA Corporation, New York, N.Y.

[21] Appl. No.: 25,099

[22] Filed: Mar. 29, 1979

[51] Int. Cl.³ .............................................. B64G 1/38
[52] U.S. Cl. .................................. 244/170; 244/164; 244/171
[58] Field of Search .............. 244/170, 171, 164, 165; 364/459, 434; 318/648, 649, 584

[56] References Cited

U.S. PATENT DOCUMENTS

| | | | |
|---|---|---|---|
| 3,695,554 | 10/1972 | Phillips | 244/170 |
| 3,830,447 | 8/1974 | Phillips | 244/170 |
| 4,096,427 | 6/1978 | Rosen et al. | 244/170 X |

Primary Examiner—J. D. Miller
Assistant Examiner—Reinhard J. Eisenzopf
Attorney, Agent, or Firm—Samuel Cohen; Robert L. Troike; J. D. Lazar

[57] ABSTRACT

A dual-spin spacecraft having a momentum wheel spinning relative to a platform to provide bias momentum utilizes cross products of inertia (POI) existing in the platform between the spinning axis and the transverse axes to achieve nutation damping. When the platform is rotating or is displaced from a reference the cross products of inertia are also rotating or are displaced causing thereby degradation of the optimum nutation damping time constant. Two or more phase shifting networks are provided to be sequentially coupled into a control loop to shift nutation signals to effect optimum nutation damping at selected positions of the rotating or displaced platform without substantial nutation damping time constant degradation.

12 Claims, 5 Drawing Figures

NUTATION DAMPING IN A DUAL-SPIN SPACECRAFT

The invention described herein was made in the performance of work under a NASA contract and is subject to the provisions of Section 305 of the National Aeronautics and Space Act of 1958, Public Law 85-568 (72 Stat. 42 U.S.C. 2457).

This invention relates to orbiting spacecraft, and more particularly to such spacecraft that consist of two coupled spacecraft components that can spin relative to each other about a single common axis, such spacecraft being of the class known as dual-spin spacecraft.

There is a need to stabilize all spacecraft or satellites of any size within closer tolerances and greater accuracy than has been achievable in the past. In many applications it is desirable that the spacecraft be maintained in a predetermined orientation or attitude with respect to a given reference direction, such as the direction of the gravity vector, with high accuracy.

A particular type of satellite suitable for accurate stabilization with very small pointing errors is the dual-spin spacecraft one component of which is a platform, the angular position of which is stabilized relative to the earth by the reaction torque generated by changes in speed of a motor-driven spinning member at times termed spinning drum, momentum wheel, attitude control wheel or stabilizing wheel. Such a wheel shall be designated herein as a momentum wheel and the platform shall be referred to as the platform or body, as such a portion is commonly designated in the art. The common axis of spin shall be called herein the spin axis and any axis orthogonal to the spin axis shall be called a transverse axis.

A dual-spin spacecraft exhibits certain types of of troublesome motions called wobble, precession, or nutation. All such motions tend to result in displacements of the spacecraft's geometric axes from the intended mission orientation or attitude.

Nutation, the coning motion of the pitch or spin axis about the total angular momentum vector, may result from any of the following disturbances: (1) final stage booster nutation, (2) operation of the separation equipment, (3) operation of the attitude control and station keeping components, (4) bombardment by micrometeorites (5) operation of payload components with uncompensated momentum, and (6) on-orbit environmentional disturbance torques.

In general, and as to be used herein nutation is rotational motion about the transverse (non-spinning) axes which causes a rotational coning motion of the pitch (spinning) axis about the total or resultant momentum vector of the spacecraft. The rate of the coning motion is termed the nutation frequency ($\omega_n$). The cone angle of such motion is the amplitude of the nutation which is a measure of the pointing error referred to above. In addition to nutation, the spacecraft may be rotated about the pitch axis relative to a reference plane or vector such as the gravity vector or the perpendicular to the earth's surface. Such a rotation is termed the pitch error designated $\theta_p$.

Nutational stability indicates the manner in which a spacecraft's stabilizing system controls or responds to nutational motions. In certain systems and under certain conditions nutation can increase after the original torque has been removed. In an undamped system, nutational motions will continue without increasing or decreasing. When the nutation decreases, it is said to be damped.

It is conventionally accepted that nutational stability is critically dependent on various parameters of a spacecraft including the moments of inertia, cross products of inertia, angular momentum, roll (or yaw) angle rotations, and the spacecraft attitude control system.

In conventional design procedures, nutation may be reduced by energy absorbing or momentum transfer devices operable about a transverse axis to attentuate nutation. Active dampers overcome nutation effects by developing a torque of opposite phase to that of the nutation. torque about a body transverse axis of opposite phase to that of the nutation rate about that axis.

In conventional designs of dual-spin spacecrafts, the axis of spin of the momentum wheel is selected to be colinear with one of the principal axes of the spacecraft, the principal axes being defined in this art as the axes about which the products of inertia vanish. In practice, some cross products remain in spite of the most careful design and manufacture techniques. The effect of cross products of inertia is the production of a torque about an orthogonal axis relative to a disturbing torque by the coupling effect of the asymmetrical mass distribution. Thus, in a dual-spin spacecraft, any change in speed of the momentum wheel causes a nutation motion on the spacecraft, the amount of which depends on the cross products of inertia of the spacecraft and the amount of speed-changing torque applied to the wheel. Accordingly, good conventional design procedures of both the mass distribution of the spacecraft as well as the stabilizing control loop dictate minimizing if not eliminating, the coupling effect into the spin axis of the cross products of inertia.

A system for effecting active nutation damping in a dual-spin spacecraft is described in my U.S. Pat. No. 3,695,554. The system described therein achieves nutation damping by utilizing cross products of inertia developed by arranging the spin axis to be skewed to the principal axes of the spacecraft. Optimum damping can be achieved with such a spacecraft having a fixed geometry whereby the cross-products of inertia are fixed by orienting its attitude sensor about the optimum sensor axis. Optimum nutation damping can be also achieved if the sensor axis cannot be altered by arranging the spacecraft geometry such that the maximum cross product of inertia exists between the pitch axis and a transverse axis located so as to develop optimum nutation damping. The transverse axis when located to determine the maximum nutation damping effect is termed herein as the "optimum transverse axis."

In U.S. Pat. No. 4,096,427 assigned to the Hughes Aircraft Company, issued June 20, 1978, there is described a damping system for a dual-spin spacecraft having a dynamically unbalanced platform. Means are provided for modifying the nutation signal to eliminate the component of the rotation rate of the rotor which is spinning relative to the platform and on which the nutation sensor is mounted.

In my U.S. Pat. No. 3,830,447 a phase shifting network is provided in the loop controlling the speed of the momentum wheel to shift the phase angle of the signal of a nutation motion sensor not located on the optimum transverse axis by a phase angle to make the sensor signal equivalent to a sensor signal from a sensor located on the optimum transverse axis. This arrangement provides peak damping of nutation motion.

In certain spacecraft, the design limitations are such as to put additional requirements on the performance of the nutation damping arrangements described in the aforementioned patents. In particular when the platform of a dual-spin spacecraft is rotating the location of the cross products of inertia (POI) in the transverse plane of the spacecraft is also rotating at the same rate as the spacecraft. Thus, when the spacecraft 11 (shown in FIG. 1 of the drawing to be described), particularly the body or platform portion 10, is rotating in a geodetic (e.g. the earth) reference frame, the roll attitude sensor 72 will provide a signal that is not properly phased to effect the derived nutation damping torques.

Furthermore, a given phase shifting network of the type described in the aforementioned U.S. Pat. No. 3,830,447 provides peak or optimum damping at only one pitch position, which reduced or degraded damping effects at all other pitch angles.

According to the present invention the problem of providing correct phasing for the nutation damping loop for a spacecraft that is rotating about the pitch axis is solved by providing two phase shifting networks. The first (primary) network provides for optimum phasing for a pitch angle of 0° relative to a predetermined orthogonal position in a geodetic reference. The second (offset) phase shifting network provides optimum phasing for a pitch angle of 90°. For pitch angles from −45° to +45° the first network is utilized while for pitch angles from +45° to +135° the second network is operative by suitable switching arrangments. For pitch angles from +135° to +225° and from +225° to +315° the first and second networks are respectively used again but the signs of the signals are reversed by a reversing switch. The correct network and sign is provided by commands from the ground or from an on-board control system utilizing the pitch angle as the control signal.

In the Drawing

Figure 1:
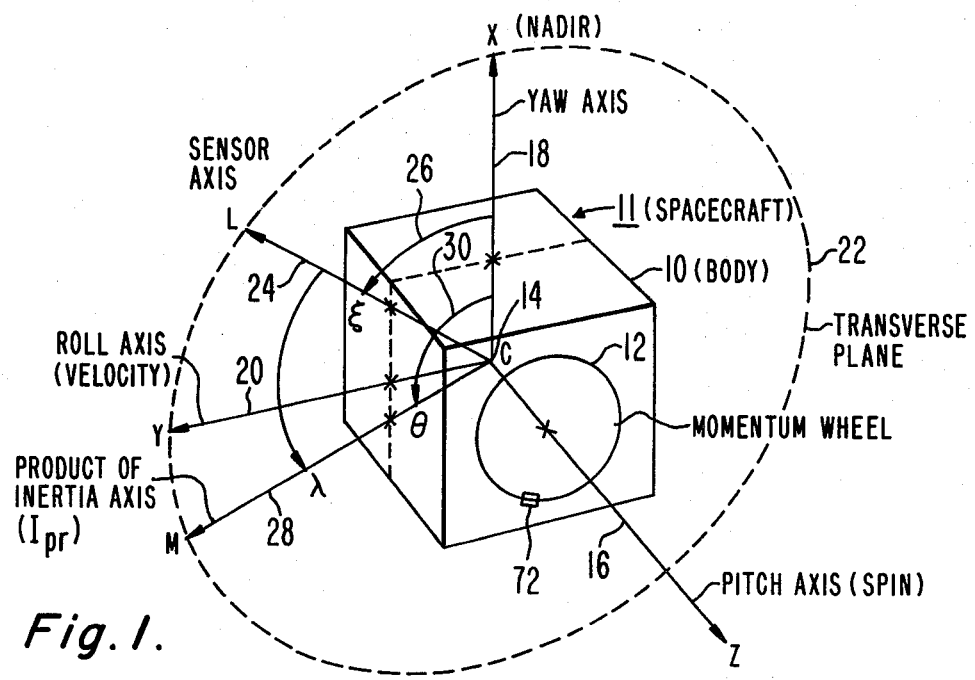
FIG. 1 is a diagram in perspective of a spacecraft showing the reference axes related to one embodiment of the invention.

FIG. 1 illustrates a spacecraft of the dual-spin type and its related axes. The spacecraft body 10 is provided with a momentum wheel 12 decoupled from the body 10 by a shaft and bearing or the like, and driven by an electrical motor, not shown, mounted in the body 10. It is to be understood that the spacecraft being described is one of several types well known the art wherein the body 10 is substantially larger in mass than the momentum member 12, and is arranged to house substantially all of the sensor equipment control apparatus and the like needed for the mission. The momentum wheel 12 is of relatively lesser mass and may carry on it the sensing equipment for attitude control, with a minimum amount of additional apparatus for mission use. It will be understood, however, that the spacecraft configuration may take on any suitable form utilizing the dual-spin principle. Accordingly, a system utilizing the invention may comprise one in which the momentum wheel 12 is the larger mass rotating at a relatively slower speed and the body 10 of smaller mass de-spun therefrom. The body may serve as a platform for those instruments functioning for or requiring geostationary orientation, that is, oriented relative to the earth whereby antennas, infrared sensors, telescopes and the like may be mounted and pointed in a stationary, fixed position relative to a chosen site on the earth's surface.

All the axes illustrated in FIG. 1, pass through the center of mass (C) 14 of the entire spacecraft 11. The pitch axis (z) 16 is the spin or momentum axis, the momentum wheel axis being in alignment with axis (z) as in conventional arrangements for such spacecraft. The yaw axis (x) 18 and the roll axis (y) 20 are in the transverse plane 22. An infinite number of other axes could be drawn through the center of mass 14 that emanate radially in the transverse plane 22. Any such axis is also called a transverse or lateral axis.

Should the spacecraft 11, comprising the body 10 and the momentum wheel 12, be nutating, any transverse axis will experience or exhibit an angular cyclic motion about such axis at the nutation frequency of the spacecraft. As known in the art, the nutation frequency for a despun platform is fixed for a given spacecraft momentum and inertia distribution. The spacecraft of the dual-spin type, being a momentum-biased spacecraft, is usually operated with a substantially constant momentum. It will be understood that in certain modes of operating a spacecraft, the momentum of such spacecraft can be changed requiring an alternative design of a nutation damping system embodying this invention.

Spacecraft utilizing this invention are assumed to operate with a substantially constant nutation frequency i.e., the wheel momentum is always large as compared to the body or platform momentum. Nevertheless, the principles of the invention may be applied to any dual-spin system, wherein for example, the body momentum becomes larger in operation as compared to the wheel momentum.

The phase difference between the cyclic motions of any two randomly selected axes in the transverse plane will be substantially equal to the angular difference between the two axes. Thus, for example, if the two axes are the yaw axis 18 and roll axis 20, the phase difference between the cycle motion would be 90° since these two axes are orthogonal.

As described in detail in my aforementioned U.S. Pat. No. 3,695,554, the attitude sensor detects angular motion about some axis (L) 24, in the transverse plane 22, which axis is inclined at an angle $\xi$ from the positive portion 18 of the x (yaw) axis in the direction of the positive portion of the y (roll) axis 20, as indicated by the arrow 26. The products of inertia (POI), as more fully explained in said patent, which exist in the platform 10 in the yaw/pitch and roll/pitch planes, are defined for the present description as $I_{xz}$ and $I_{yz}$, respectively. $I_{xz}$ and $I_{yz}$ can be expressed as a composite POI $I_{pr}$, where:

$$I_{pr} = \sqrt{I_{xz}^2 + I_{yz}^2} \tag{1}$$

$I_{pr}$ exists in the plane defined by the z axis 16, and an axis (M) 28 in the transverse plane 22. Axis 28 is inclined at an angle $\theta$ from the positive x axis 18 in the direction of the positive y axis 20, as indicated by arrow 30. The angle $\theta$ can be expressed as having a value defined by the following relationship:

$$\theta = \arctan(I_{yz}/I_{xz}) \qquad (2)$$

The attitude sensor 72 suitably mounted in the spacecraft on the bias wheel 12 or in the body portion 10, provides a signal proportional to the detected cyclic motion (nutation) to a pitch loop or momentum wheel control loop, the sensor signal modulating the momentum wheel motor torque at nutation frequency. Depending upon the angular difference $\lambda$, between $\theta$ and $\xi$ where:

$$\lambda = \theta - \xi \qquad (3)$$

the torque can force the nutation angle to grow or decay.

If $\lambda$ is varied from 0° to 360°, there is one value of $\lambda$ namely, $\lambda_o$, which gives maximum nutation damping.

As described in my aforesaid U.S. Pat. No. 3,695,554, the optimum or maximum damping of nutation can be achieved in a spacecraft whose products of inertia are fixed, by positioning the sensor such that the sensor angle $\xi$ in conjunction with the fixed product of inertia angle (30) $\theta$ yields the optimum angular difference $\lambda_o$. For a spacecraft where the sensor angle $\xi$ (26) is fixed, the required optimum damping of nutation can be achieved by arranging the mass distribution of the spacecraft such that the composite product of inertia $(I_{pr})$ angle $\theta$ (30) in conjunction with the fixed sensor angle $\xi$ (26) yields the optimum difference $\lambda_o$. Such a control system can handle the problem of nutation damping provided the body is de-spun about the pitch axis, or if not de-spun, provided a body-referenced (not geodetic) nutation sensor is used. In certain spacecraft missions, pitch rates are required so that there is a continuous rotation of the spacecraft body about the pitch (16) or spin axis causing thereby a continuously changing pitch error. Such a configuration puts a severe strain on a system if a geodetically referenced sensor is used because of the known degeneration of damping caused by a change or error of the pitch angle from a given reference. It is known that the damping time constant is an inverse function of the cosine of the difference between $\lambda$ and $\lambda_O$ for a given spacecraft configuration. Thus, if the sensor reference axis (L) 24 in FIG. 1 is fixed in a geodetic reference axis set, while the POI axis (M) 28 is of necessity measured in a body axis reference, and the body is rotating in pitch relative to the geodetic axis set, then $\lambda$ must also be rotating by the same amount as the pitch rotation. Thus, it can be seen that for a change of 90°, when the cosine reaches a value of zero, the degeneration of damping will be infinite. Such a condition is totally unacceptable for maintaining the stability of a spacecraft. Such a problem is solved, according to the present invention, as will be described.

Figure 2:
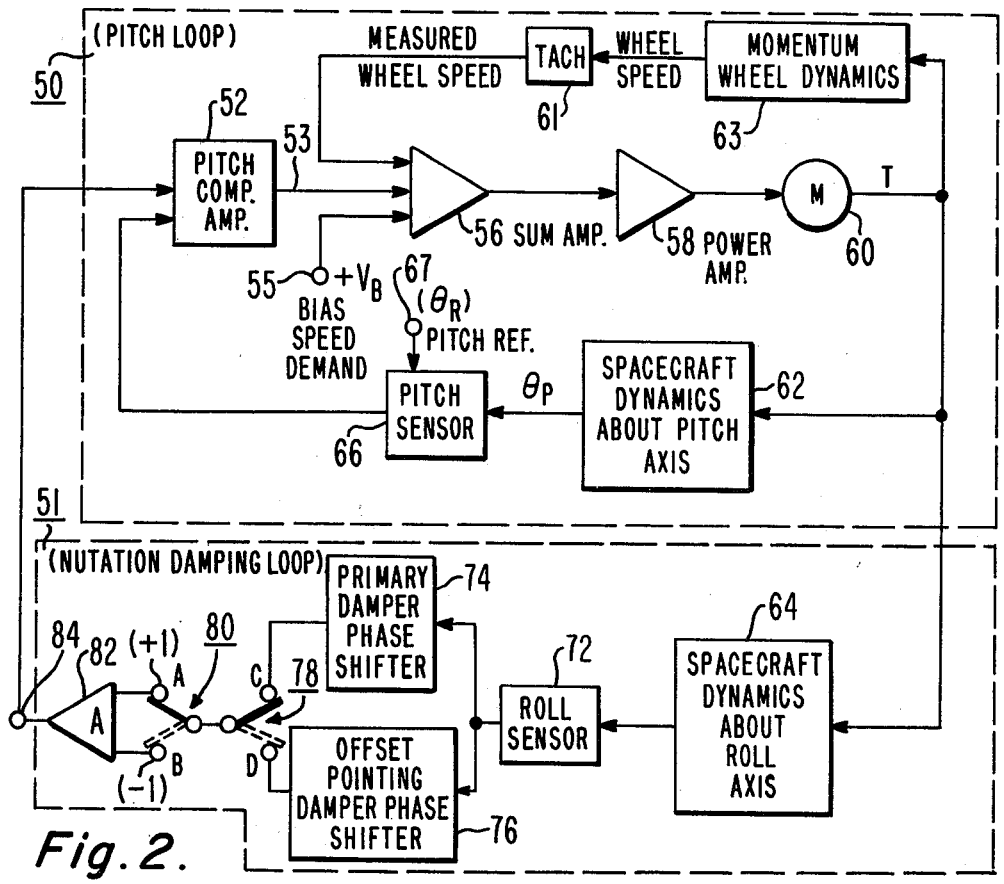
FIG. 2 is a block diagram of the pitch control loop and nutation damping loop of a spacecraft embodying the invention.
Figure 3:
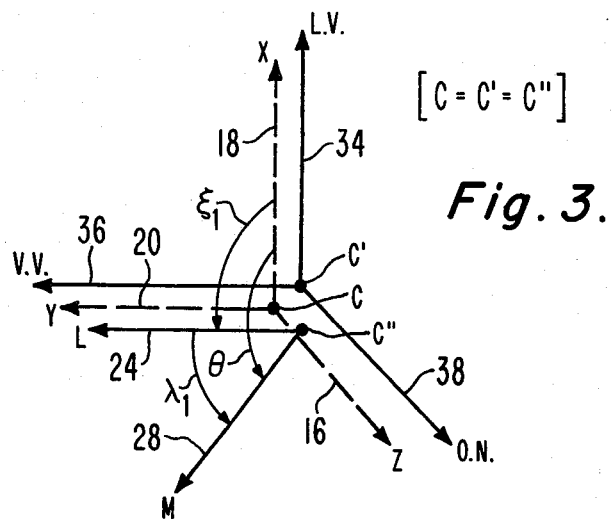
FIGS. 3 and 4 are diagrams showing respectively the spacecraft axes related to the geodetic axes for a zero pitch error and a typical pitch error condition.

Before proceding to the embodiment, illustrated in FIG. 2, by which the nutation damping loop (51) solves the problem of a spacecraft having a continuous change of pitch, an understanding of the phenomena of the rotating POI as a result of the rotatin spacecraft can be understood by reference to the vector diagram illustrated in FIG. 3. The spacecraft body axes 16, 18 and 20, correspond respectively, to the pitch axis z, the yaw axis x and the roll axis y of spacecraft 11 illustrated in FIG. 1 as above described.

Assume the spacecraft 11 is oriented in orbit such that the body (10) pitch roll and yaw errors, are zero. Thus, the geodetic reference axes (orbit normal) 38, (local vertical) 34, and (velocity vector) 36 will be coincident to the body axes 16, 18 and 20 respectively. The geodetic reference axes are the local orbit normal axis 34, the velocity vector axis 36 and the orbit normal axis 38. It should be understood that the geodetic axes set rotates about the orbit normal axis 38 once per orbit whereby the local vertical axis (LV) 34 and the velocity vector axis (VV) 36 rotate at a fixed rate of once per orbit; moreover the rotation of the geodetic axes is independent of the attitude of the spacecraft 11. Continuing with the explanation of FIG. 3, for pictorial convenience, the center of the spacecraft C is shown in FIG. 3 displaced from the geodetic center C' and from the center C" for the sensor (L) axis and product of inertia axis. Nonetheless, it should be understood that the three centers (C, C', C") are coincident and identical. The POI axis 28 is at an angle $\theta$ with the yaw body axis 18. FIG. 3 represents the relationship of the geodetic reference axes and the body axis for a spacecraft 11 in which the body yaw and roll axes 18 and 20 are aligned with the geodetic axis 34 and 36. Accordingly, the pitch error is zero with reference to the geodetic reference frame.

Figure 4:
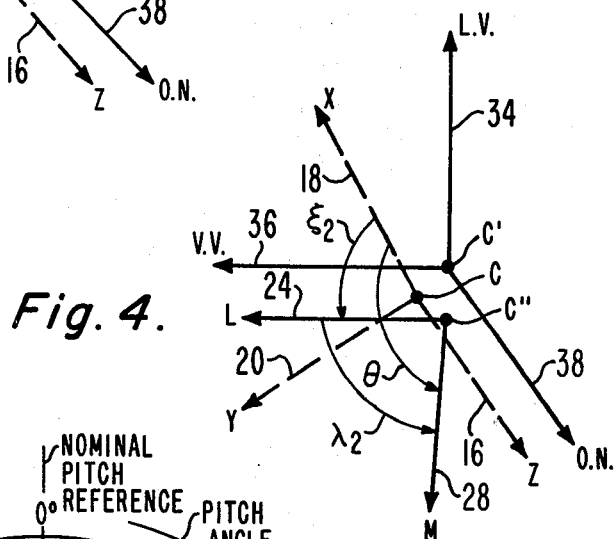

In FIG. 4, there is shown the same axes but in different relative positions changed as a result of a pitch error of, for example 30°. The pitch error means that the roll axis 20 and the yaw axis 18 are rotated about the pitch axis by 30° by motion in the transverse plane, perpendicular to the spin axis 16. It should be understood that even though the roll axis is rotated by 30°, the roll angle which may have existed, will not change when measured by a geodetically referenced sensor (earth sensor for example, but not a gyroscope or accelerometer). This phenomenon is caused by the nature of the nutation roll sensor 72, which is measuring roll error relative to a geodetic reference frame. Thus, no change occurs in a measured roll signal even though the spacecraft 11 rotates in pitch.

Thus, the (L) axis 24, about which roll is measured is fixed in the geodetic reference frame. When the spacecraft body 10 rotates about the pitch axis 16, the (L) axis (24) about which the roll error is measured, must also rotate in the opposite direction relative to the body axis. This phenomenon will be explained in more detail by way of the following example.

Assume that spacecraft 11 is in an attitude in which the pitch axis 16 and the roll axis 20 are aligned with the orbit normal vector 38 and the velocity vector 36, respectively. Consider next that a roll error 10° is introduced. This means that the spacecraft 11 has rotated about the roll axis 20 by 10°. More precisely the spacecraft has rotated about the geodetic velocity vector 36 by 10°. The pitch error is still assumed to be zero. The roll sensor 72 (for example an earth horizon sensor), to be described with respect to FIG. 2, will determine the error of 10° by conventional procedures known in the art, i.e. by scanning the horizon of the earth.

Next, assume that spacecraft 11 is rotated through a pitch angle of 30°. As spacecraft 11 is maneuvered through a pitch rotation of 30°, the geodetic roll axis 36 (the velocity vector) is essentially rotated by 30° in the opposite direction from the rotation of the pitch rotation relative to the spacecraft body coordinates (16, 18 and 20).

The roll angle or roll error is measured by the horizon sensor (72) mounted on the momentum wheel 12 in FIG. 1 or any alternative sensor means which measures the roll angle defined as the angle thorugh which the pitch axis (16) moves or departs from the horizontal plane, the horizontal plane being perpendicular to the vertical 34. Any sensor that measures this angle or its equivalent may be used in the practice of this invention. Such a sensor may be a conventional static or scanning earth sensor adapted to measure both roll and pitch errors, or a star and sun sensor combination with ephemeris correction logic as known in the art.

The angular relationships of the movements of spacecraft 11 represented by the various vectors of FIGS. 3 and 4 can be evaluated in a straight-forward manner.

The angle $\lambda$, in general, represents the angle between the sensor axis 24 and the POI axis 28 and is defined in equation (3), where as previously defined, $\theta$ is the angle from the yaw axis 18 to the POI axis 28, and $\xi$ is the angle from the yaw axis 26 to the sensor axis 24 (FIG. 1).

When the pitch angle is zero, the value of $\xi$ for zero degrees pitch is designated $\lambda_1$ (FIG. 3). The value of $\xi$ at an arbitrary angle of $\beta$ is designated $\xi_2$.

Similarly, for the angle $\lambda$, when the pitch angle is zero, $\lambda$ is designated $\xi_1$ and when the pitch angle is $\beta$, $\lambda$ is designated to $\lambda_2$.

Thus, when the pitch angle is zero, $$\lambda_1 = \theta - \xi_1 \tag{4}$$

and with a pitch angle of $\beta$:

$$\lambda_2 = \theta - \xi_2 \tag{5}$$

but for the reasons given above:

$$\xi_2 = \xi_1 - \beta \tag{6}$$

Substituting equation (6) into (5) results in:

$$\lambda_2 = \theta - \xi_1 + \beta \tag{7}$$

and substituting equation (4) into (7) results in:

$$\lambda_2 = \lambda_1 + \beta \tag{8}$$

Equation (8) shows that a rotation in pitch results in the same rotational change in $\lambda$ as shown in FIG. 4 and described above.

Reference is now made to FIG. 2 in which there is shown a pitch loop and nutation damping loop control system coupled to the spacecraft dynamics according to the invention.

The upper portion of the schematic in FIG. 2 is the pitch loop 50 while the lower portion shows the nutation damping loop 51. The components of the pitch loop and the nutation damping loop comprise essentially conventional control hardware well known in the art. The components comprise a pitch compensating amplifier 52 which provides a symmetrical positive and negative voltage. The output of amplifier 52 is coupled as one input to a summing network 56 having three inputs and one output. The output of the summing amplifier 56 is coupled to a power amplifier 58 for driving a motor 60. Motor 60 may be an alternating current or direct current type of motor. Motor 60 drives momentum wheel 12 (FIG. 1) and is coupled to a tachometer 61 via momentum wheel dynamics 63. The characteristic response of wheel 12 is represented by the momentum wheel dynamics 63. The speed of wheel 12 is measured by a tachometer 61 which provides a proportional voltage signal as a second input to summing amplifier 56. The third input to amplifier 56 is a bias speed demand signal voltage ($V_B$) via terminal 55. Signal $V_B$ may be preset to a fixed value to define the nominal speed of motor 60 or varied if desired for changing speed requirements. The motor torque T developed by any change in output voltage from power amplifier 58 can induce in the spacecraft 11 angular motions about all of the three body axes (X,Y,Z). If there are no products of inertia (POI) between the spin axis 16 and the transverse axis 18 and 20, no transverse torques, and thus no body motions will be induced about the transerse axes. However, with the existence of cross products of inertia (POI) a torque T from motor 60 can induce a motion about the transverse axes 18 and 20 such as to attenuate any angular motion that may have previously existed, such angular motion being the nutation of a spacecraft 11.

The spacecraft dynamics about the pitch axis and the roll axis is represented by blocks 62 and 64, respectively. The dynamics particularly includes the cross products of inertia (POI), suitably selected to induce the coupling effect required in response to motor torque T. Any torque T developed by motor 60 will cause the platform or body 10 to rotate by a certain angular rotation about the pitch axis 16, this rotation being the pitch error $\theta_p$, as described in detail in my aforementioned U.S. Pat. No. 3,695,554. The pitch sensor 66 provides signals proportional to the differences between the angle $\theta_p$ and a pitch reference position $\theta_R$ provided to sensor 66 at terminal 67. The reference $\theta_R$, as known in the art, maybe an index on the horizon sensor to calibrate the sensor to a predetermined reference depending on the orientation of sensor to the spacecraft body 10. The sensor output signal is coupled to amplifier 52 as one of two inputs thereto, the second input being derived from the nutation damping loop 51 to be described.

Signals from pitch sensor 66 coupled to amplifier 52 will cause motor 60 to generate a correcting torque to null out the error indicated by pitch sensor 66 as well as the roll sensor 72 in a manner well known in the art (described, for example, in the aforementioned patents). Furthermore, amplifier 52 also serves to alter the signal from sensor 66 for pitch loop stability purposes, also in a manner well known in the art of spacecraft attitude control.

The spacecraft dynamics 64 about the roll axis 20 will be sensed by roll sensor 72 which is coupled to the respective inputs of a primary damper phase shifter 74 and an offset pointing damping phase shifter 76. The outputs of the phase shifters are coupled respectively through switch terminals C and D of a single pole switch 78, the common terminal of which being coupled to the common terminal of another single pole switch 80 having alternate terminals A and B. The respective terminals of switch 80 are coupled as alternative inputs of a differential amplifier 82, the output of which being coupled via terminal 84 to compensation amplifier 52.

Differential amplifier 82 is a conventional difference sign reversing amplifier that functions to respond to two applied signals such that a positive value applied at terminal A will provide a positive valued signal at the output terminal 84, while a positive signal at input terminal B will become negative at the output terminal 84. Negative signals at A and B become negative or positive, respectively, at terminal 84. The purpose of a reversing amplifier 82 will be explained more fully hereinafter.

Phase shifting network 74 serves to shift the phase of the roll sensor 72 by the required electrical phase shift defined by the difference of λ at zero pitch error (FIGS. 3 and 4) and $\lambda_o$ described hereinabove. The angular difference determined by this relationship represents the angular displacement of difference of the axis of sensor (72) and the optimum axis for achieving maximum nutation damping. Phase shifting network 76 shifts the phase by an additional 90° from that of network 74, to achieve the optimum damping at a pitch angle of 90° (because λ also changes by 90° as explained above). The phase shifting networks 74 and 76 may assume any suitable form such as an operational amplifier arranged to provide the phase shift required.

In operation it is assumed that the spacecraft 11 is in an earth orbit although the invention may be practiced in any planetary orbit. The positive yaw axis 18 (the arrowhead representing the positive direction) is first pointing along the vertical (LV) 34, the pitch axis 16 being normal to the orbit and the roll axis 20 pointing in the direction of movement of the spacecraft along the orbit. The momentum wheel 12 is rotating about the spin axis 16 providing the spacecraft with bias momentum. The spacecraft body 10 is de-spun from the wheel 12 and is rotating at a very low rotation rate (for example, about 0.025 radians per second, or about one quarter revolutions per minute) caused by constantly changing input reference command signal $\theta_R$. The spacecraft body, accordingly, is rotating about the z axis 16 causing the x and y axis to rotate at the rate of rotation of the body relative to the geodetic axes 34 and 36, respectively. Thus, at about 30° of rotation, the roll and yaw axes 18 and 20 will assume the position as illustrated in FIG. 4. Pitch sensor 66 responds to a signal representing the difference angle $(\theta_R - \theta_p)$ indicating the pitch rotation. Pitch sensor 66 in response to signal $(\theta_R - \theta_p)$ will tend to close that error to zero in the loop via amplifier 52 by changing the relative speed of motor 60 to compensate for the rotation. Thus, the spacecraft pitch position will follow the pitch reference position $\theta_R$. Signals indicating the roll error (nutation) are sensed by roll sensor 72 along the axis 24. Assuming the switches 78 and 80 are in the position as shown in FIG. 2, the primary damper phase shifter 74, responding to the roll sensor signal will effect nutation damping via switch positions C and A into the +1 terminal of differential amplifier 82. Amplifier 52, in response to the voltage from amplifier 82 causes motor 60 to effect a transverse torque proportional to the generated pitch torque via the POI as described hereinabove. Optimum nutation damping is effected only with the pitch angle of 0° for these switch positions. As the pitch angle advances for 0° to 45°, the damping effect is degraded as a cosine function. As indicated above, the amount of nutation damping degradation is approximately equal to the damping time constant at the optimum pitch angle multiplied by the reciprocal of the cosine of the pitch rotation from the optimum pitch angle. Thus, for a nutation damper loop designed for an earth oriented spacecraft, pitch rotations of ±45° from its orthogonal position will produce increases in the nutation time constant of no more than 1.4 times, (1.4 times being the value of the reciprocal of cosine 45°). Accordingly, the damping effect can be improved by switching the nutation damping loop to select shifter 76 which is arranged to provide an optimum nutation performance for a pitch angle of 90°. Thus, by operating switch 78 from Position C to D the loop will utilize phase shifter 76. As spacecraft 11 rotates further about pitch axis 16 towards 90° the performance of nutation damping will be improved to the optimum value when the pitch angle is 90°.

Figure 5:
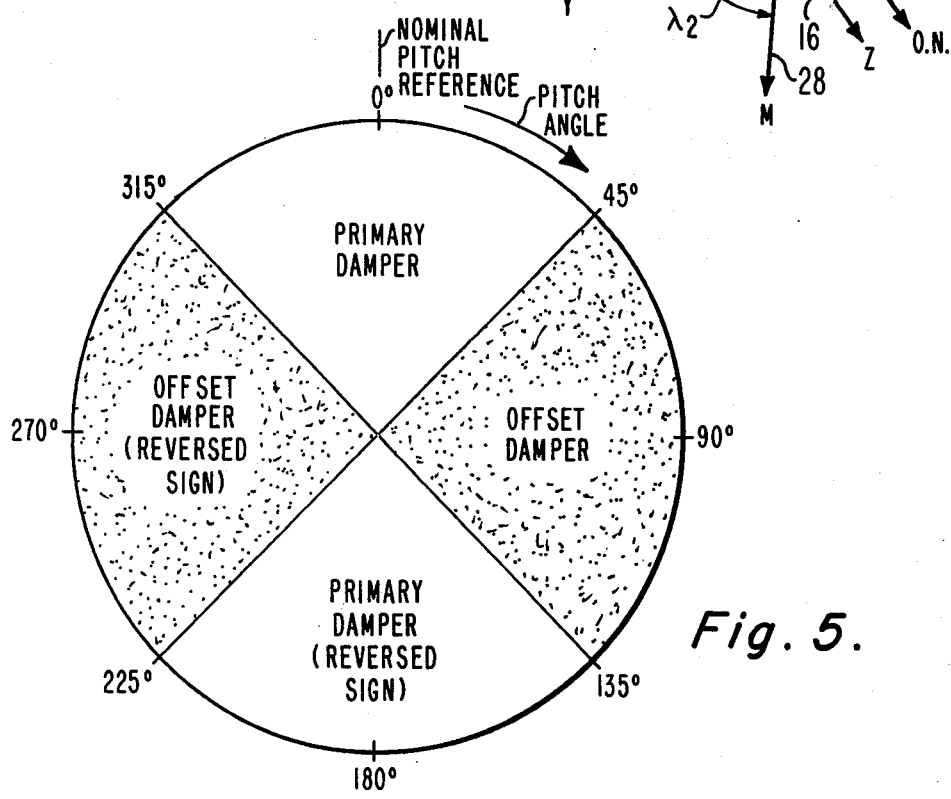
FIG. 5 is a diagram showing the states of the active nutation damper loop for the preferred embodiment.

In similar manner, as the spacecraft rotates to a pitch angle of 135°, the loop is again switched so that phase shifter 74 is in the loop by operating switch 78 from position D to position C. Also switch 80 is changed to transfer the input of amplifier 82 from the A position to the B position, thereby operating phase shifter 74 with a reversed sign (180° phase shift), causing motor M to change the sign of the motor torques (T) in response to the nutation signal. This switch configuration exists for angles of 135° to 225°. At an angle of 225°, switch 78 is switched again to the D position, but with switch 80 kept in the B position. Operation in this mode is continued for pitch angles from 225° to 315°. Note that the angle of 315° is the same as the angle of 45° of pitch angle. Thus, for pitch angles greater than 315° the initially described switch configuration is again utilized, i.e., switches 78 and 80 are in the C and A positions, respectively. A chart showing the various sectors of the pitch error at which the various dampers are operated in the normal or reversed sign mode is illustrated in FIG. 5.

The embodiment described applies to a spacecraft in which the platform 10 is continously rotating at a low rate relative to the wheel 12. This rotation rate it should be understood, can be fixed or variable depending upon the chosen form of the signal for $\theta_R$ at terminal 67. However, it should be appreciated that $\theta_R$ can be a single fixed value whereby the spacecraft is stationary with a pitch offset fixed at the preset value determined by the value of $\theta_R$. For such a mode of operation the system will operate such that one of the networks (74 or 76) will be switched into and kept in the loop in a position corresponding to the pitch angle sector of operation shown in FIG. 5.

If desired, a greater number of phase shifters (74, 76, etc.) designed for smaller or narrower zones of operation may be provided or utilized to provide closer optimum damping for all pitch angles. Thus four networks would reduce the degradation of the nutation damping time constant from 1.414 to 1.082 times the optimum value.

It will be understood that the practice of this invention provides nutation damping for a rotating or despun body in which the reference axis for the roll (nutation) measurement is a geodetically referenced axis, i.e., measured relative to orbital rather than spacecraft body coordinates. It should be noted and further understood that the systems of the prior art do not provide for nutation damping when the pitch error is continuously changing and the sensor is geodetically referenced.

In summary, for pitch angles from $-45°$ ($+315°$) to $+45°$ the first network, phase shifter 74, is used with the switches 78 and 80 in the position shown. When the pitch angle is in the range of $+45°$ to $+135°$ the second network, namely, the phase shifter 76, is switched into the circuit. For pitch angles from $+135°$ to $+315°$ the same two networks 74 and 76 are used in their opposite quadrants, but the sign of the signal therefrom is reversed, by reversing switch 80. Accordingly, the correct network and sign can be commanded on board the spacecraft 11 or from the ground as a function of the measured pitch angle as represented by the pitch sensor 66.

What is claimed is:

1. A method of stabilizing an orbiting spacecraft of the dual-spin type having a spin axis and a characteristic nutation frequency, and further having a platform which can spin relative to a motor-driven spinning wheel, said wheel spinning about the spin axis of the spacecraft, said spin axis being common to said platform and said wheel, a control loop including a motor for driving said wheel and consequently by reaction torques between said wheel and said spacecraft rotating said spacecraft and further including a first sensor and a second sensor, said first sensor oriented to sense motion of said spacecraft about a given geodetic reference lateral axis, and said second sensor oriented to sense pitch errors manifested by rotation of the platform of the spacecraft about the spin axis from a given reference to control the speed of said motor to reduce pitch errors towards said reference, said spacecraft further having cross products of inertia existing on said platform between at least one of the lateral axes and the spinning axis, comprising the steps of:
   a. driving said wheel at a speed to thereby rotate said spacecraft about said spin axis;
   b. sensing by said first sensor the geodetic referenced lateral motion of the spacecraft about one of said geodetic referenced lateral axes;
   c. generating a signal corresponding to the sensed geodetic referenced lateral motion having a cyclic component at the nutation frequency for controlling the torque of the motor;
   d. phase shifting the cyclic component of the generated signal by said first sensor at the nutation frequency of said spacecraft by an amount such that the signal from said first sensor is shifted in phase by a first angle such that the first sensor signal is equivalent to a sensor signal of a sensor located on a lateral axis wherein substantially optimum nutation damping is achieved at one angular position of said spacecraft about said spin axis as said spacecraft rotates through a first angular displacement;
   e. applying the phase shifted signal to said control loop to control the torque of said motor;
   f. phase shifting the cyclic component of the generated signal by said first sensor at the nutation frequency of said spacecraft by an amount such that the signal from said first sensor is shifted in phase by a second angle such that the first sensor signal is equivalent to a sensor signal of a sensor located on a lateral axis wherein substantially optimum damping is achieved at a second angular position of said spacecraft about said spin axis as said spacecraft rotates through a second angular displacement; and
   g. applying the second-mentioned phase-shifted signal to said control loop to control the torque of said motor.

2. The method of claim 1 further comprising the steps of:
   a. phase-shifting said second-mentioned sensor signal by a 90° phase angle relative to the phase of said first-mentioned signal;
   b. switching said first signal into said control loop for pitch angles of −45° to +45°;
   c. switching said second signal into said control loop for pitch angles of +45° to +135°;
   d. inverting the phase of said first switched signal for pitch angles of +135° to +225°;
   e. inverting the phase of said second switched signal for pitch angles of +225° to +315°.

3. The method of claim 1 including changing said wheel speed for a finite period of time whereby said spacecraft is rotated to a fixed predetermined angular displacement.

4. The method of claim 1 wherein said wheel is driven at a speed such that said spacecraft is continuously rotating.

5. The method of claim 1 further comprising the steps of:
   a. generating a reference signal manifesting said pitch errors sensed by said second sensor for controlling the rotation rate of said spacecraft about said spin axis; and
   b. switching said phase shifting signals in response to said reference signal such that the respective said optimum nutation damping angular positions correspond substantially to the angular position of said rotating spacecraft about said spin axis.

6. An attitude stabilized dual-spin type spacecraft having a spin axis and a characteristic nutation frequency, and further having a platform which can spin relative to a motor-driven spinning wheel, said wheel spinning about the spin axis of the spacecraft, said spin axis being common to said platform and said wheel, a control loop including a motor for driving said wheel and consequently by reaction torques between said wheel and said spacecraft rotating said spacecraft and further including a first sensor and a second sensor, said first sensor oriented to sense motion of said spacecraft about a given geodetic reference lateral axis, said second sensor oriented to sense pitch errors manifested by rotation of the platform of the spacecraft about the spin axis from a given reference to control the speed of said motor to reduce pitch errors towards said reference, said spacecraft further having cross product of inertia existing on said platform between at least one of the lateral axes and the spinning axis, comprising:
   a. means for driving said wheel at a speed to thereby rotate said spacecraft about said spin axis;
   b. means for sensing by said first sensor the lateral motion of the spacecraft about one of said geodetic reference lateral axes;
   c. means for generating a signal corresponding to the sensed geodetic reference lateral motion having a cyclic component at the nutation frequency for controlling the torque of said motor;
   d. means in said control loop for phase shifting the cyclic movement of the generated signal by said first sensor at the nutation frequency of said spacecraft by an amount such that the signal from said first sensor is shifted in phase by a first angle such that the first sensor signal is equivalent to a sensor signal of a sensor located on a lateral axis wherein substantially optimum nutation damping is achieved at one angular position of said spacecraft about said spin axis as said spacecraft rotates through a first angular displacement;
   e. means responsive to the phase shifted signal to control the torque of said motor;
   f. means in said control loop for phase shifting the cyclic component of the generated signal by said first sensor at the nutation frequency of said spacecraft by an amount such that the signal from said first sensor is shifted in phase by a second angle such that the first sensor signal is equivalent to a sensor signal of a sensor located on a lateral axis wherein substantially optimum damping is achieved at a second angular position of said spacecraft about said spin axis, as said spacecraft rotates through a second angular displacement; and g. means responsive to the second-mentioned phase-shifted signal to control the torque of said motor.

7. A spacecraft according to claim 6 further comprising switch means for selectively switching said first mentioned and said second mentioned phase shifting means into said control loop at predetermined angular positions of said spacecraft.

8. A spacecraft according to claim 7 wherein said switch means is controlled manually.

9. A spacecraft according to claim 7 wherein said switch means is controlled by a signal generated by said second sensor.

10. A spacecraft according to claim 6 wherein said wheel is driven at a constant speed and said spacecraft is rotated continuously.

11. A spacecraft according to claim 6 including means for changing said wheel speed whereby said spacecraft is rotated to a fixed predetermined angular position.

12. A nutation control system for a dual-spin stabilized device having a platform, a wheel, a motor, a nutation sensor and a pitch sensor, in which the invention comprises at least two phase shifting networks selectively coupled to said nutation sensor and to said motor to cause said motor to apply a torque to said device to reduce the amount of nutation, and further, said pitch sensor being coupled to said motor to control the rotation of said device about the axis of said motor.

* * * * *